US 6,567,233 B1

(12) United States Patent
Chew et al.

(10) Patent No.: US 6,567,233 B1
(45) Date of Patent: May 20, 2003

(54) 4-D SHOCK-SENSING FOR HARD-DISK DRIVES

(75) Inventors: Kok-Kia Chew, Fremont, CA (US); Gerald Keith Lunn, San Jose, CA (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/443,375

(22) Filed: Nov. 19, 1999

Related U.S. Application Data
(60) Provisional application No. 60/109,311, filed on Nov. 20, 1998.

(51) Int. Cl.$^7$ ................................................. G11B 19/04
(52) U.S. Cl. ..................... 360/77.05; 360/60; 360/61; 360/77.08
(58) Field of Search ..................... 360/77.05, 60, 360/61, 63, 67, 68, 75, 77.08, 78.04, 78.14

(56) References Cited

U.S. PATENT DOCUMENTS

| | | | |
|---|---|---|---|
| 4,048,660 A | | 9/1977 | Dennison et al. |
| 4,575,775 A | | 3/1986 | Albrecht ................. 360/77.08 |
| 4,706,138 A | | 11/1987 | Jove et al. |
| 4,807,063 A | * | 2/1989 | Moteki ..................... 360/77.07 |
| 4,809,120 A | * | 2/1989 | Ozawa ................ 360/77.08 X |
| 4,833,551 A | * | 5/1989 | Song ......................... 360/77.05 |
| 4,896,228 A | * | 1/1990 | Amakasu et al. ........ 360/77.08 |
| 4,924,160 A | | 5/1990 | Tung .................... 360/78.07 X |
| 5,153,786 A | | 10/1992 | Sidman |
| 5,341,255 A | | 8/1994 | Starr et al. |
| 5,400,201 A | | 3/1995 | Pederson |
| 5,477,402 A | * | 12/1995 | Elliott et al. ............. 360/77.08 |
| 5,796,543 A | | 8/1998 | Ton-That |
| 6,208,480 B1 | * | 3/2001 | Tigner ......................... 360/63 |
| 6,226,140 B1 | * | 5/2001 | Serrano et al. ................ 360/60 |
| 6,351,342 B1 | * | 2/2002 | Elliott et al. ............. 360/77.08 |

FOREIGN PATENT DOCUMENTS

JP   6-20412 A  *  1/1994

OTHER PUBLICATIONS

"Disc File Controlled by Multiplexed Servo Samples," IBM TDB Vol. 28, No. 8, Jan. 1, 1986, p. 3257.*

* cited by examiner

Primary Examiner—David Hudspeth
Assistant Examiner—James L Habermehl
(74) Attorney, Agent, or Firm—Robert P. Bell; Steven A. Shaw; Steven Lin

(57) ABSTRACT

There is a need for low-cost and reliable shock-sensing methods in magnetic hard-disk drives to maintain data integrity when a drive is subjected to external shocks. The present invention uses a novel shock-sensing method that is both reliable and low-cost, using a modified head preamplifier to detect servo fields from adjacent disk surfaces, as well as the disk surface being written or read. Servo fields on adjacent surfaces may be staggered. When a write head is writing data to a data field on a disk surface, a read head may be reading a servo field from an adjacent surface, insuring that the write head is on-track. By staggering the servo fields from surface to surface, shock may be sensed by measuring displacement of read heads on adjacent surfaces between servo sectors on the write surface. In addition, the use of a shock sensor or the like may be eliminated, reducing drive component cost.

28 Claims, 8 Drawing Sheets

| S | D | D | D | D | D | S | D | D | D | D | D | S | D | D | D | D | D | S | D |

Figure 8
(Prior Art)

| S | D | D | D | D | D | S | D | D | D | D | D | S | D | D | D | D | D | S | D |
| D | D | D | S | D | D | D | D | D | S | D | D | D | D | D | S | D | D | D | D |

Figure 9

| S | D | D | D | D | D | S | D | D | D | D | D | S | D | D | D | D | D | S | D |
| D | D | D | S | D | D | D | D | D | S | D | D | D | D | D | S | D | D | D | D |

| D | S | D | D | D | D | S | D | D | D | D | D | S | D | D | D | D | D | D |
| D | D | D | S | D | D | D | D | D | S | D | D | D | D | D | S | D | D | D | D |

| D | D | S | D | D | D | D | D | S | D | D | D | D | D | S | D | D | D | D |
| D | D | D | D | D | S | D | D | D | D | D | S | D | D | D | D | D | S | D | D |

Figure 10

4-D SHOCK-SENSING FOR HARD-DISK DRIVES

CROSS-REFERENCE TO RELATED APPLICATIONS

The present application claims priority from Provisional U.S. Patent Application Ser. No. 60/109,311, filed on Nov. 20, 1998, and incorporated herein by reference.

FIELD OF THE INVENTION

The present invention relates to the field of hard disk drives for use in computer systems. In particular, the present invention relates to a technique for improving tracking of a write head and improving shock sensing in a hard disk drive system.

BACKGROUND OF THE INVENTION

Areal densities for magnetic hard disk-drives continue to grow aggressively in recent years, with no sign of abating in the foreseeable future. As areal density grows beyond 10 $Gb/in^2$ towards 100 $Gb/in^2$, there is a need to shrink the bit aspect ratio from the present 15–20:1 down to about 4:1, in order to achieve sufficient head/media signal-to-noise ratio. Consequently, track densities are required to grow substantially more aggressively than linear densities as the storage industry progresses on the 60% (or higher) areal density growth curve.

As tracks-per-inch (TPI) grow from 25K TPI (10 $Gb/in^2$) to 200K TPI (100 $Gb/in^2$), issues related to data integrity in the presence of operating shock and the ability to servo precisely/quickly on tracks 0.12 $\mu$m wide will become substantially more severe. These issues are described, for example, in Chew K.K., "Control Systems Challenges to High Track Density Magnetic Disk Storage", *IEEE Trans on Magnetics,* Vol. 32, No. 3, May 1996, pp. 1799–1804, and Chew K.K., "Efficient Adaptive Fast Short Moves for Magnetic Disk Drives Utilizing Magneto-resistive Heads", *Proceedings of the Second World Congress on Intelligent Control and Intelligent Automation,* Jun. 23–27, 1997, pp. 1053–1057.

State-of-art servo technology uses so-called embedded servo position information to derive position information to position the read/write head to the desired read/write position. Position information is embedded within the data track, usually taking up less than 10% of the overall capacity. The servo sampling time ranges (depending on high or low performance) from 100 $\mu$s to 200 $\mu$s in current technology (10K TPI for high-end and 17K TPI for mobile drives) and is projected to be reduced by square root of increase in TPI.

To position/move the read/write head more accurately/ quickly, a higher bandwidth servo system is required. This requires a higher sampling rate and more servo information to be embedded in the data tracks. Since position information is derived from finite discrete servo fields embedded within a data track, the servo control system is essentially operating open-loop in-between servo information. Any shock of sufficient magnitude may force the read/write head to wander significantly off track-center without the controller's knowledge.

There are two aspects of data integrity in the presence of operating shock. If a shock happens during a read operation, the head will start to read adjacent track information. The error-correcting code (ECC) capability in the drive will indicate invalid information in the data stream, causing the erroneous data sector to be read again. This is a soft-error and affects the performance and throughput in the drive, but does not affect data integrity, as the ECC will detect the error and cause the drive to re-read the erroneously read sector or sectors.

If a shock happens during a write operation with the write-head continuing to write while the head traverses off track-center over adjacent tracks, previous information in adjacent tracks will be written over. This causes a hard-error and inability to correctly retrieve data on current and adjacent tracks. Once data is written onto adjacent tracks, adjacent track data may be altered in a manner which is uncorrectable. Moreover the tracks for which data was intended to be written to may contain old data or an uncorrectable combination old and new data.

Present embedded servo methodology compromises position accuracy (through bandwidth limitations) and data integrity (due to lack of servo information while reading or writing data). Moreover, random access times are typically sacrificed (because of inadequate seeking bandwidth) with higher acoustic noise induced during seeking (due to large step changes in control signals).

In prior art hard drives, when the read/write head is between servo fields, the drive controller does not know whether the read/write head on- or off-track. If an external shock is inflicted on the drive during this time, the read/write head may wander substantially off-track. For example, if the drive sustains a shock of 100 g (typical of opening and closing a desk drawer), it may move more than 100$\mu$" off-track in between servo fields, equivalent to 1-track in a 10K TPI drive. If the head is in a write mode, such an event will lead to catastrophic overwriting and corruption of an adjacent track.

One present solution is to include a shock sensor in the drive that senses external shocks of sufficient magnitude and immediately shuts off writing. See, for example, Levy L., "Smart Shock Sensors Preserve Data Integrity in Hard Drives", *Data Storage Magazine,* May/June 1996, pp. 33–39.

The shock sensor approach has at least two disadvantages. First, the shock sensor is itself a mechanical device, having its own mechanical characteristics with regard to shock and vibration. During normal drive seeking operations, the drive may generate internal shocks in excess of 50 g. If a sensor is set to trip above 20 g, the sensor may falsely trigger even in normal drive operations. Moreover, the sensor may take a longer time than the seek settling time for its own vibrations to die away, taking a much longer time than is necessary to remove write inhibit signals. Second, the cost of the shock sensor is an additional cost to the drive. The external shock sensor cost depends on the number of axes required to detect transient shocks.

Another solution is to write more servo information per track, so that off-track position measurements may be made more frequently, enabling the drive to issue a write inhibit command before the read/write head wanders too far off-track to cause catastrophic data corruption during writing. With more servo information per track, a higher servo bandwidth may be achieved, leading to better seeking, settling and tracking performances as well as reduction of acoustic noise during seeking from a higher sampling rate.

Using additional servo information is also an unattractive solution, as it increases the servo overhead and reduces drive format efficiency (i.e., ratio of data sectors to servo sectors). In addition, using additional servo information reduces overall drive capacity and leads to increased cost per megabyte. Consequently, more aggressive areal density design points are required to meet drive capacity requirements, which ultimately adversely affecting final manufacturing yields.

In the prior art, early hard drives were known which provided one or more disk surfaces comprising only servo sectors (a so-called "dedicated" servo surface). Such hard disk drive might comprise a number of disks arranged along a common spindle with a number of read/write heads arranged along a common control arm. One side of one disk might comprise only servo sectors, and no data. That servo disk may be used to track data reads and write to all other surfaces of all other disks in the drive. Such techniques, however, a rarely used today, due to the high overhead associated with using an entire disk surface for servo sectors.

Tung, U.S. Pat. No. 4,924,160, issued May 8, 1980, discloses the use of staggered servo sectors on alternate sides of a disk (FIG. 4). Tung is primarily directed toward a technique for accelerating and decelerating a drive head. Since Tung accelerates the drive head so rapidly, the chances of missing a servo sector while crossing the disk are increased (Col. 2, lines 47–51). Thus, Tung uses a "staggered seek" to reduce the likelihood of missing a servo sector during such a rapid seek.

Tung teaches that all read heads are available during a seek operation as "there is no write operation taking place during seek mode in a typical disk drive" (Col. 3, lines 4–6). Thus, other drive heads may be used for seeking other sectors. Tung teaches switching ("scanning") between read heads during a seek operation (Col. 3, lines 34–41). However, Tung explicitly teaches that his device is not used during short seeks of less than seven tracks. (Col. 3, lines 51–53).

Tung teaches staggered servo sectors, and a seek and settle technique. However, Tung is very narrowly directed toward the idea of using staggered sectors as a seek technique. Tung does not discuss or address shock sensing. Moreover, Tung explicitly teaches away from writing during a read operation (or vice versa).

SUMMARY OF THE INVENTION

There remains a need for low-cost and reliable shock-sensing methods in magnetic hard-disk drives to maintain data integrity when a drive is subjected to external shocks. The present invention provides a novel shock-sensing method and apparatus which is both reliable and low-cost, using a the head preamplifier to detect off-track writing.

In the present invention, servo fields for each surface in a disk drive are staggered from one another. Thus, a servo field for one disk surface may coincide with a data field for another surface. By modifying the read/write head amplifier circuitry, a disk drive controller may alternately read servo field information from adjacent disk surfaces, effectively increasing the amount of servo information available to the controller, without increasing the overall amount of servo information per track.

BRIEF DESCRIPTION OF THE DRAWINGS

FIG. 8 is a simplified diagram illustrating how servo information, in the prior art, may be written on a data track on one surface of a disk.

FIG. 9 is a simplified diagram illustrating how, in the present invention, servo information may be written on data tracks on both surfaces of a disk, in a staggered fashion.

FIG. 10 is a simplified diagram illustrating how, in an alternative embodiment of the present invention, servo information may be written on data tracks on both surfaces of multiple disks to provide better shock detection.

DETAILED DESCRIPTION OF THE INVENTION

Figure 1:
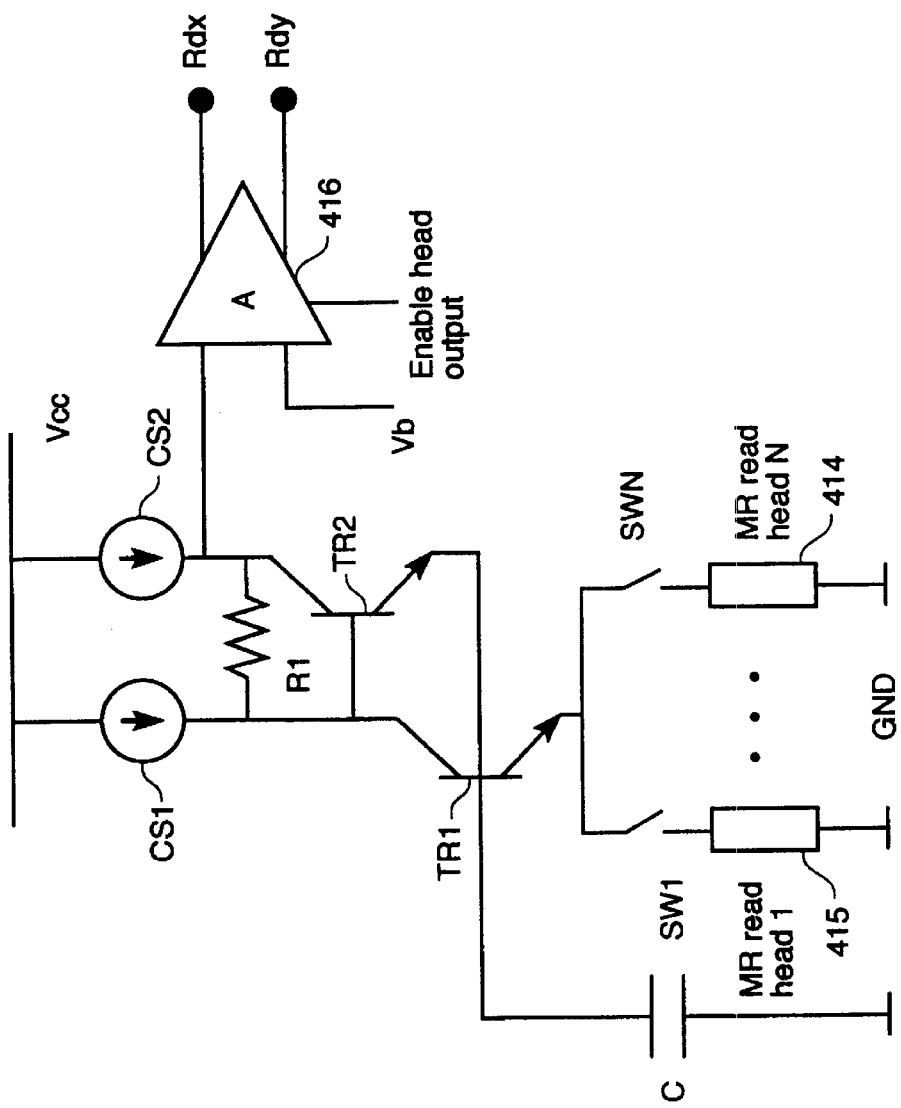
FIG. 1 is a block diagram of an example of a prior art low-noise magneto-resistive (MR) read head preamplifier.

The method and apparatus described herein removes both the limitations described in Background of the Invention by providing shock sensing without incurring additional overhead and without an expensive external shock sensor.

FIG. 8 is a simplified diagram illustrating how servo information may be written on a data track on one surface of a disk. For the purposes of illustration, the data track is illustrated as linear series of fields. In the diagram of FIG. 8, D indicates a data field or sector, and S indicates servo field. When the read/write head of a disk drive is located between servo fields S, the read/write head is either writing or reading data D and has no information on whether it is on- or off-track center.

As noted above, it is possible to improve tracking performance by increasing the number of servo fields S, however, for each additional servo field S, a corresponding data field must be lost, decreasing drive capacity and data density of the drive.

Most hard disk drives write data to both surfaces of a disk. Many hard disk drives comprise multiple disks attached to a common spindle. In these prior art disk drives the locations of servo fields S are coincident. That is to say, each servo field lies directly above or below a corresponding servo field (for the same track) on an adjacent disk or disk surface. This prior art technique was utilized as it is much easier and faster to format a hard disk with coincident servo fields by driving all write heads simultaneously during a low-level formatting process.

FIG. 9 is a simplified diagram illustrating how, in the present invention, servo information may be written on data tracks on both surfaces of a disk, in a staggered fashion. In a typical hard disk drive, there are many disks with each disk having two surfaces. In the present invention, the data-track format on opposing surfaces of a given disk may be written as illustrated in FIG. 9.

In the middle of the data fields of either surfaces, there are servo fields from the opposite surface. If the head amplifier is toggled to read the servo information on either surfaces, then the effective servo sampling rate may doubled, and the off-track shock-sensing capability is improved (i.e. the actuator is not operating completely in open-loop when it is reading or writing data).

In other words, by staggering the locations of servo fields S on different disk surfaces, an effective increase in servo sectors may be achieved without sacrificing any data sectors. Altering the read/write head amplifier circuitry to track alternate servo fields S allows the drive controller to more accurately track write head position during a write operation. As a result, shock sensing hardware may be eliminated from the drive design, reducing cost while simultaneously improving performance of the drive.

FIG. 10 is a simplified diagram illustrating how, in an alternative embodiment of the present invention, servo information may be written on data tracks on both surfaces of multiple disks to provide better shock detection. In this second embodiment, the invention may be extended to an N-disk drive, alternating the servo information evenly across the 2N surfaces to obtain a 2N effective servo-rate and a substantially improved shock-sensing rate. In FIG. 10, an example of a 3-disk, 6-side track layout which is capable of giving 6× more shock-sensing capability is illustrated.

Since the present invention may depend on servo-patterns distributed in three dimensional space and on servo information that has chronological ordering, it is appropriately dubbed a 4-D shock-sensing method and apparatus.

As noted above, modifications to read/write head amplification circuits may be required in order to implement the present invention. However, these modifications, discussed below, add little, if any, additional cost to the disk drive controller. Thus, the improved performance of the present invention may be achieved at little or no additional cost, and moreover a cost savings may be achieved by eliminating an external (and notably unreliable) shock sensing component.

Disk-drive preamplifiers today are designed to perform read or write operations exclusively and from only one head at a time. See, for example, Jove et al., U.S. Pat. No. 4,706,138, issued Nov. 10, 1987; Klaassen, K. B., "Magnetic Recording Channel Front-ends", *IEEE Transactions on Magnetics,* vol. 27, no. 6, November 1991, pp. 4503–4508; and Klaassen, K. B., Van Peppen J. C. L., "Read/write Amplifier Design Considerations", *IEEE Transactions on Magnetics,* vol. 31, no. 2, March 1995.

An example of a prior art low-noise magneto-resistive (MR) read head preamplifier stage is illustrated in FIG. 1. During reading, any one of MR read elements MR read head 1 through MR read head N may be selected for reading by closing corresponding switch SW1 through SWN and enabling the output at last amplifying stage 110 so that an amplified head signal appears at the output lines Rdx, Rdy.

In the amplifier of FIG. 1, supply voltage $V_{cc}$ supplies voltage through current sources CS1 and CS2 to transistors TR1 and TR2, which, with decoupling capacitor C, form a pulse amplifier which converts a single-ended amplifier stage to a differential output. Rdx and Rdy are the read output pins from read channel postamplifier 416 which in turn is fed to read channel block 402 of FIG. 4.

A number N of MR read heads MR read head 1 (415) through MR read head N (414) may be provided to read a corresponding number of disk surfaces. In the embodiment of FIG. 1, a number N of switches SW1 through SWN may be provided to couple a corresponding MR read head 414 through 415 to the pulse amplifier. In the prior art, such switches would also simultaneously engage corresponding write heads. In the present invention, however, switches SW1 . . . SWN may be selectively engaged independently of write head switching.

Figure 2:
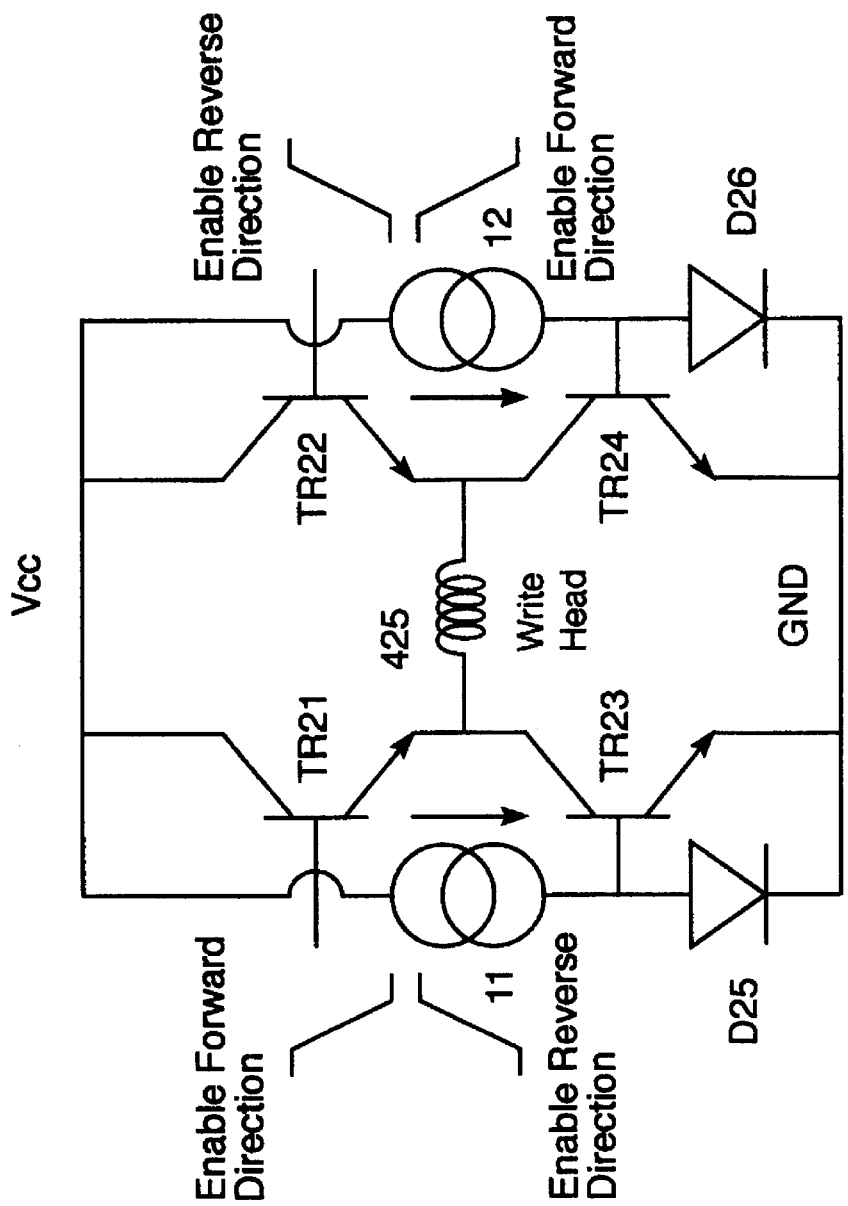
FIG. 2 is a simplified schematic diagram of a write head driving circuit.

FIG. 2 is a simplified schematic diagram of a write head driving circuit of the prior art. The write head driving circuit of FIG. 2 illustrates in more detail one of the write driver circuits 421 through 422 of FIG. 4.

The write driver circuit of FIG. 2 is formed in an H-shaped bridge circuit. To activate MR write head 425 to write in a forward direction (e.g., write data 1), transistors TR21 and TR24 may be turned on to pass current in a first direction through MR write head 425. To activate MR write head 425 to write in a reverse direction (e.g, write data 0), transistors TR22 and TR23 may be turned on to pass current in a second direction through MR write head 425.

Current sources I1 and I2 may be selectively controlled to activate transistors TR23 and TR24, respectively, to control writing direction of MR write head 425. Diodes D24 and D25 provide bias voltage to transistors TR23 and TR24.

Figure 3:
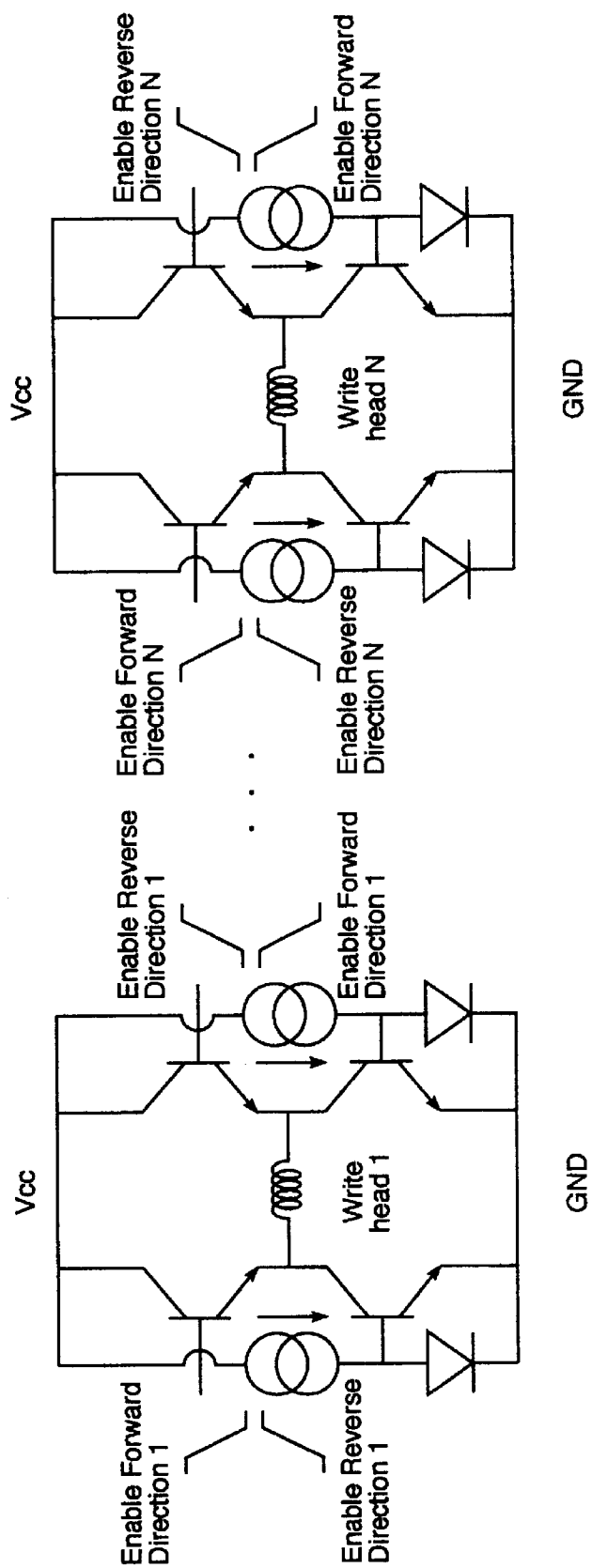
FIG. 3 illustrates how the write head driving circuit of FIG. 2 may be expanded for N write heads.

During writing, the write driver of any one of N inductive write element circuits, as illustrated in FIG. 3, may be selected. According to the bit pattern to be written on the media the desired write current is induced to flow in the inductive write element in the forward or reserve polarity by enabling the H-bridge in the desired direction.

Prior Art read/write head preamplifier technology only allows each read/write head to be selected at a given time during normal operating conditions. In particular it is usual to turn off the read amplifier (or disable the output stage) during writing.

Figure 4:
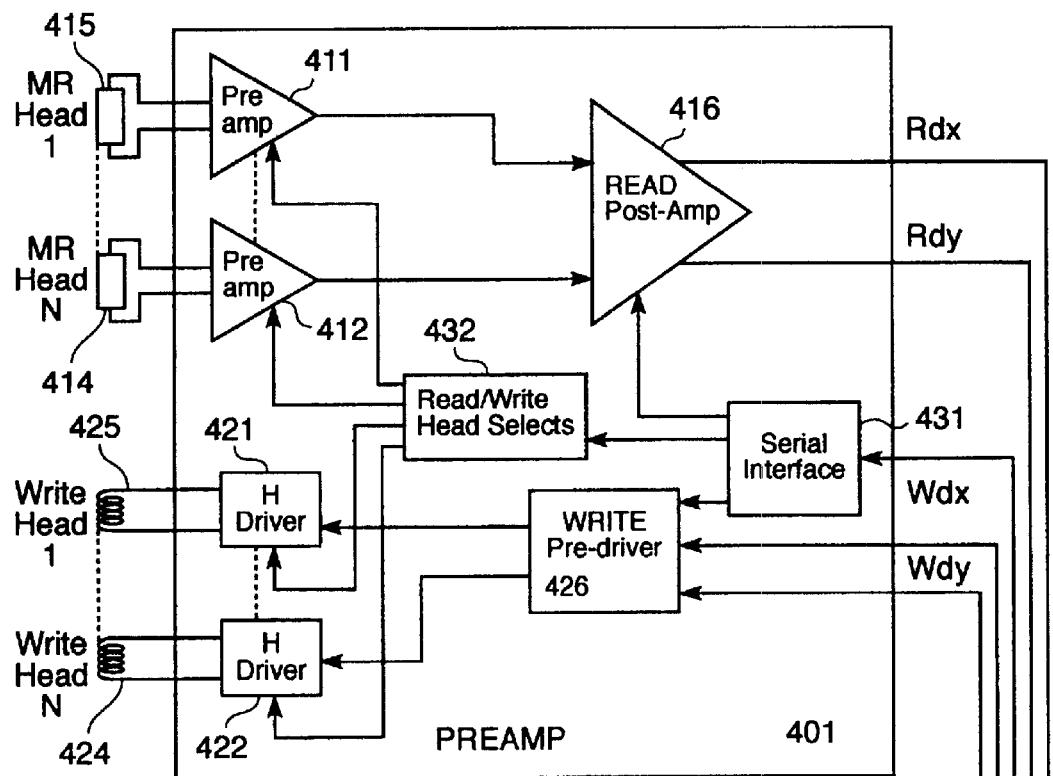
FIG. 4 is a block diagram of MR heads with inductive writers and a MR preamplifier and read channel combination.
Figure 4:
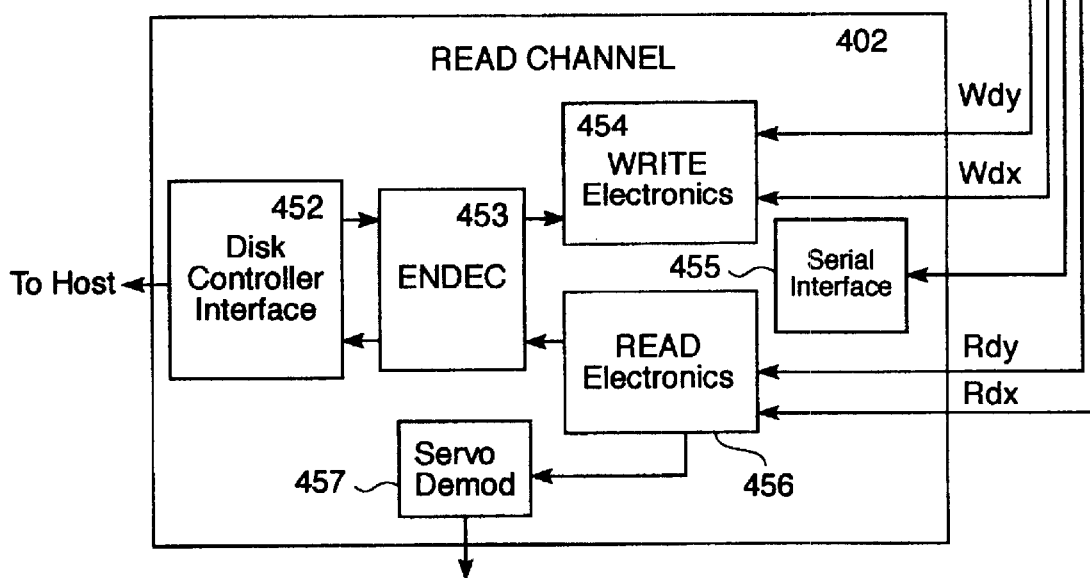

A block diagram of MR heads with inductive writers, MR preamplifier and read channel combination is illustrated in FIG. 4. In a hard disk drive, the heads, preamplifier 401 and read channel block 402 are required to function appropriately to read or write the desired information. As illustrated in FIG. 4, in modern disk drives, the read and write electronics are quite decoupled from each other. This decoupling facilitates implementation of the 4-D shock sensor and servo-oversampler.

In the diagram of FIG. 4, a number of MR read heads 1 through N (415 and 414, respectively) are illustrated. The number of MR read heads 415 and 414 provided may depend upon the number of drive surfaces to be read. For a hard drive having a single disk, N may equal 2. For a three-disk embodiment, N may equal 6, or one MR head for each disk surface (side).

Each of N read heads 415, 414 may be coupled to a corresponding number of read preamplifiers 411,412. Each preamplifier may be activated by read/write head enable 432. The structure of individual read preamplifiers 411, and 412 is illustrated in FIG. 1. Note however, that in FIG. 1, individual switches SW1 . . . SWN are illustrated for enabling a particular read head. In contrast, in FIG. 4, individual preamplifiers 411 through 412 may be provided, each enabled by a signal from read/write head enable 432. In the embodiment of FIG. 1, signals from read/write head enable 432 may instead switch one or more of switches SW1 . . . SWN. It should be appreciated that both the embodiments of FIGS. 1 and 4 are encompassed within the spirit and scope of the present invention.

Output signals from read head preamplifiers 411 through 412 may be fed to read channel postamplifier 416 which in turn outputs read channel signals Rdx and Rdy to read channel block 402. Serial interface 431 receives control signals from read channel block 402 and selectively activates read channel postamplifier 416 and also sends control signals to read/write head enable 432.

A number of write heads 1 through N (425 and 424, respectively) may be provided adjacent to corresponding read heads 415 and 414, respectively, each on corresponding articulating arms for scanning the disk surface, as is known in the art. For the purposes of illustration, read heads 415,414 and write heads 425,424 are illustrated separately in FIG. 4. Note that write heads 425 through 424 may comprise inductive elements, where as MR read heads 415 through 414 may comprise magneto-resistive elements.

Write heads 425 through 424 may be driven by N respective write driver circuits 422 through 421. For N write heads, N write driver circuits may be provided. When a given disk surface is to be written, a corresponding write driver 422 through 421 may activated by read/write head enable 432. Alternately, switching circuits, similar to switches SW1 . . . SWN in FIG. 1, may be provided to selectively switch a single write driver to a plurality of heads. Signals from write pre-driver 426 may then be written to a respective disk surface through a corresponding one of write heads 425 through 424.

Read channel block 402 detects the raw read signals Rdx and Rdy from preamplifier 401. Read signals Rdx and Rdy are analog signals as read (and amplified) from MR read heads 415 through 414. Read electronics 456 process analog signals Rdx and Rdy using a PRML channel (PR4, EPR4 channel) converter. Read electronics 456 samples raw data Rdx and Rdy and performs an A/D detection to output digital 0's and 1's.

Disk controller interface 452 acts as a host interface to a host CPU. Disk controller interface 452 outputs digital data over a local or system bus to a host CPU (not shown) and in return receives data and instructions from host CPU (not shown). ENDEC (encoder/decoder) 453 encodes data to be sent to the host CPU and decodes data and instructions received from the host CPU. Instructions from the host CPU may include instructions to read from or write to the disk, to a particular file, sector or the like.

Write electronics 454 receives decoded data from ENDEC 453 and convert the data into analog write signals Wdx and Wdy for writing to the disk drive. Write electronics 454 perform other write functions (e.g., write precompression, or "precomp") as is known in the art. Serial interface 455 receives signals from write electronics and read electronics 454 and 456 and communicates those signals to preamplifier 401 via a serial interface.

Servo demodulator 457 receives AGC (Automatic Gain control) field, track address, and servo burst signals from analog read signals Rdx and Rdy during a servo field read. From the grey code, servo demodulator 457 may decode what physical address (e.g., track, sector) a read/write head is located at. From the servo burst (ABC burst), the servo demod can determine how far off track a read/write head is located.

In the present invention, read electronics 456 may be modified from the prior art to read servo sector data from adjacent tracks during a write operation. During a write operation, read electronics 456 may signal, through serial interface 455 and serial interface 431, to read/write head enable, to alternately read servo data from MR read heads 415 through 414. Thus, for example, in a single disk (two surface) embodiment, servo data may be alternately read from staggered servo sectors on alternate sides of a disk by toggling between read heads 414 and 415. Read/write head enable 432 may be modified to allow selection of different read heads during a write operation.

Several different embodiments are described here for shock sensing. In the first embodiment, write shock sensing may be provided. In this scheme, the read amplifier of another head is allowed to be enabled while writing continues on the current head. This configuration is the simplest and does not require substantial additional electronics. In an MR head preamplifier, this requires the ability to enable the bias current of another read head and ensuring the read output is enabled.

Servo demodulation may either be done in preamplifier 401 or read channel block 402. If demodulation is done by read channel block 402, read electronics 456 of read channel block 402 may be used for servo demodulation. If servo demodulation is performed in preamplifier 401, servo demodulation electronics need to be included in preamplifier 401.

Although simple, this scheme is usually adequate for most applications, since shock sensing is most important during writing.

Figure 5:
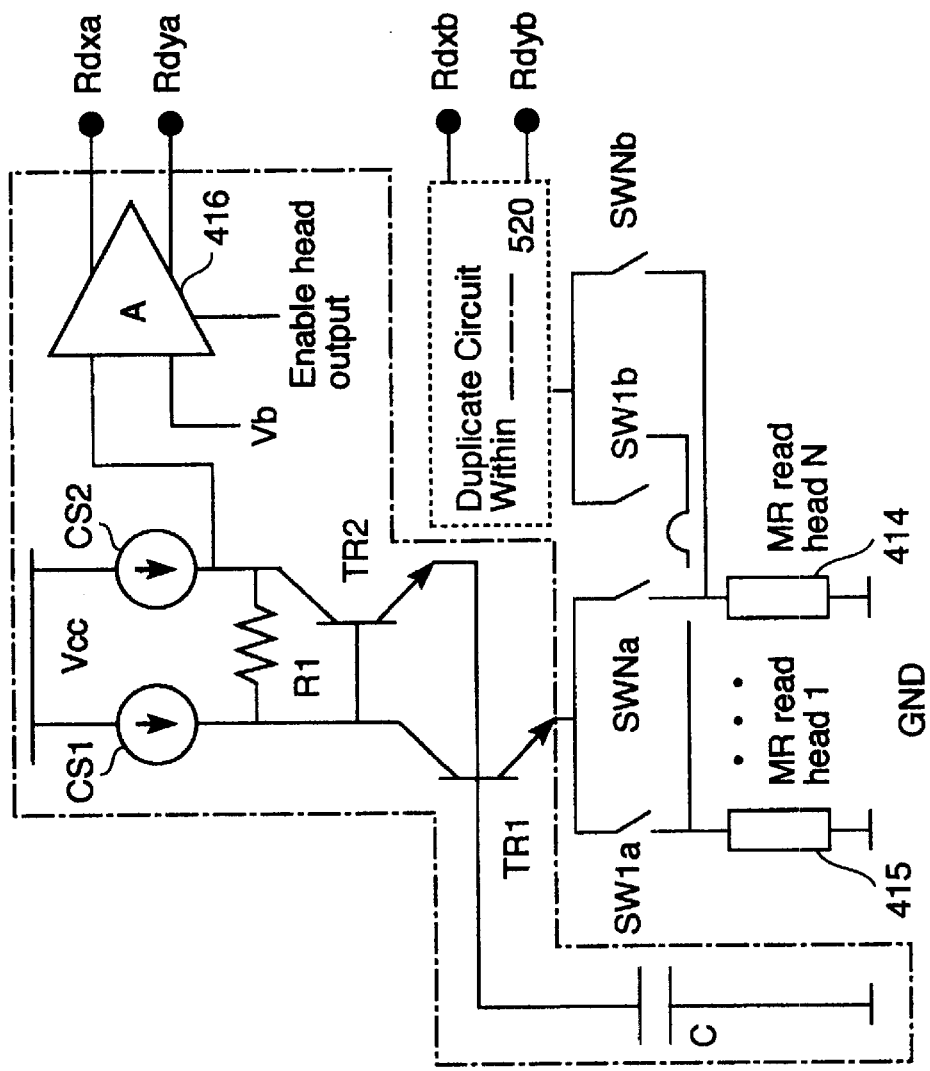
FIG. 5 is a block diagram illustrating a modified read amplifier for shock sensing for both writing and reading.

FIG. 5 is a block diagram illustrating a modified read amplifier for shock sensing for both writing and reading. For the sake of illustration, components in common with the embodiment of FIG. 4 are given common reference numerals. In this scheme, parts of the read amplifier are duplicated as duplicate read circuit 520 so that an alternate head may be chosen for reading the servo information while the current head is performing write or read operations.

A second set of switches SW1b through SWNb for N MP read heads 415 through 414 is provided. This second set of switches SW1b through SWNb allows duplicate read circuit 520 to read sector information during a read operation while the primary read circuit is reading data.

Servo demodulation may either be done in the preamplifier or the read channel. If servo demodulation is done by the read channel, an additional (simple) read front-end for servo is required in the read channel for servo over-sampling during data reading. If it is done in the preamplifier, servo demodulation electronics need to be incorporated in the preamplifier.

The embodiment of FIG. 5 is more flexible in providing shock-sensing in reading, writing, seeking, settling, track-following modes. However, the more complicated electronics required to implement this scheme may make it less commercially attractive. Moreover, as read data errors are not fatal (as write errors are), such a circuit may be less critical to operation of a hard drive. Nevertheless, the circuit of FIG. 5 may be useful in reducing access times, particularly in hard drives prone to shock conditions (e.g., laptop computers and the like).

Since the position information in this 4-D scheme is now distributed across different surfaces and disks, care has to be taken to interpret the demodulated position error signal (PES), in particular, because of disk runouts. See, for example, Chew K.K., "Actuator Control in Disk Storage Systems—PES and Continuous Repetitive Disturbance Estimation and Rejection", $10^{th}$ *IFAC Symposium on System Identification, SYSID* July 1994, Vol. 1, pp. 227–233, incorporated herein by reference. Due to thermal stress or disk-shifting from external shocks, a robust algorithm is needed to account for the many different combinations of runouts in 2 different surfaces.

Figure 6:
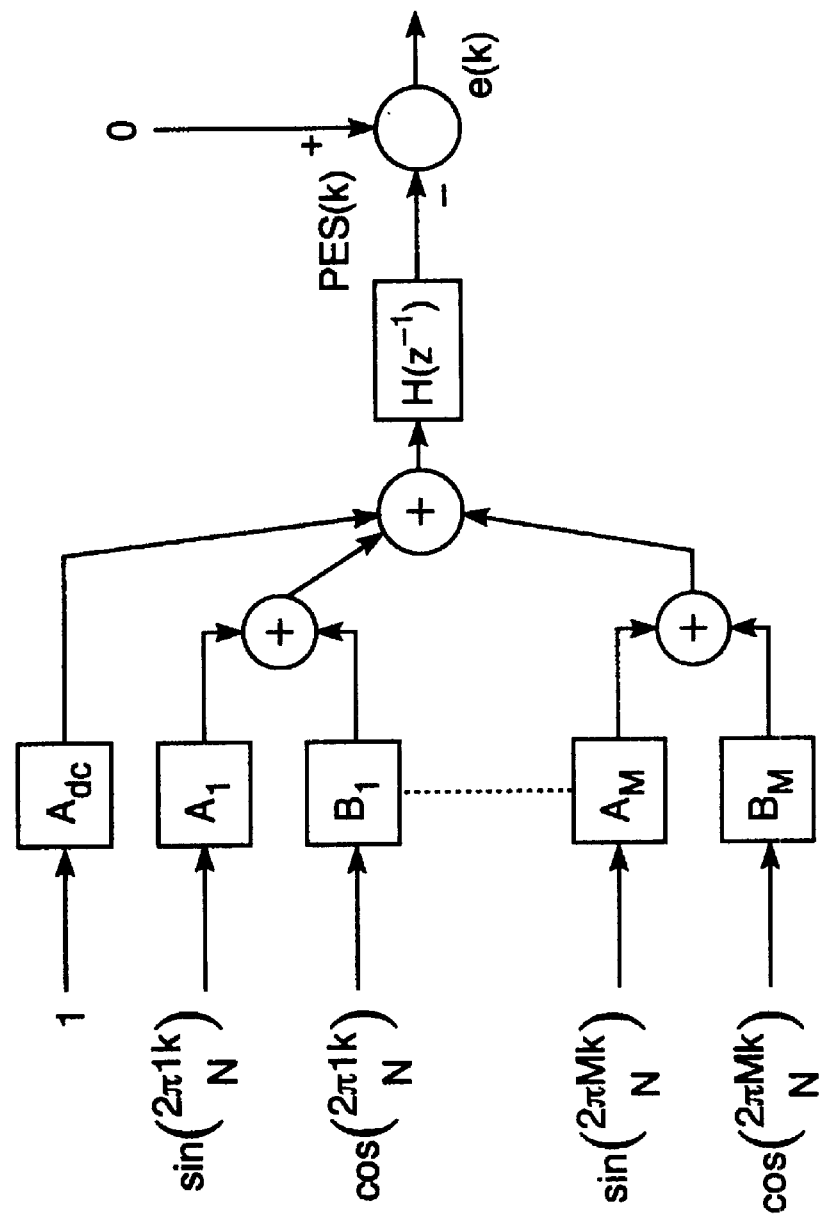
FIG. 6 is a block diagram illustrating a variation of a least-mean-squares (LMS) adaptive algorithm posed for runout identification and/or rejection.

To motivate further discussion, a variation of least-mean-squares (LMS) adaptive algorithm posed for runout identification and/or rejection is first discussed. An example of such a LMS algorithm is illustrated, for example, by Widrow, B., Stearns S. D., "Adaptive Signal Processing", ©1985 by Prentice Hall Inc., Englewood Cliffs, N.J. 07632, Chapter 6, incorporated herein by reference. A block diagram of the general problem is illustrated in FIG. 6.

For disk-drive applications, a periodic signal with a periodicity of N samples is considered; the periodicity corresponding to the total number of servo samples per track. This periodic signal will be a linear combination of integer (N/2) sinusoids (including DC). The goal of the modified-LMS algorithm is to drive the PES signal asymptotically to zero by modifying the weights $A_m$ and $B_m$. This may be done using the following algorithm:

$$S_m(k) = A_m(i)\sin\left(\frac{2\Pi mk}{N}\right) + B_m(i)\cos\left(\frac{2\Pi mk}{N}\right) \quad (1)$$

where:

$$\begin{bmatrix} A_m(i+1) \\ B_m(i+1) \end{bmatrix} = \begin{bmatrix} A_m(i) \\ B_m(i) \end{bmatrix} + \frac{\lambda_m}{\gamma_m}\begin{bmatrix} \cos(\phi_m) & \sin(\phi_m) \\ -\sin(\phi_m) & \cos(\phi_m) \end{bmatrix}\begin{bmatrix} \epsilon_A(i) \\ \epsilon_b(i) \end{bmatrix} \quad (2)$$

and:

$$\begin{bmatrix} \epsilon_A(i) \\ \epsilon_B(i) \end{bmatrix} = \begin{bmatrix} \frac{2}{N}\sum_{k=0}^{N-1} PES(k)\sin\left(\frac{2\Pi mk}{N}\right) \\ \frac{2}{N}\sum_{k=0}^{N-1} PES(k)\cos\left(\frac{2\Pi mk}{N}\right) \end{bmatrix} \quad (3)$$

$$\phi_m = 2\Pi\frac{m}{N} \quad (4)$$

$$\gamma_m = |H(e^{-j\Pi h_{im}})| \quad (5)$$

Where $\lambda_m$ is the adaptation gain at each frequency.

There are two aspects of track-runouts which may be dealt with in the present invention. First, for the current head that is reading or writing data, the read/write head has to follow the desired read/write track-center with high fidelity, even though the center-line may have shifted due to thermal stress or mechanically moved due to external shocks inflicted on the drive. This is the runout rejection problem, normally dealt with in conventional control systems.

Second, when shock-sensing or position information is derived from servo measurements from another head/surface, the information has to be discounted for track runouts. This is the runout identification problem.

Figure 7:
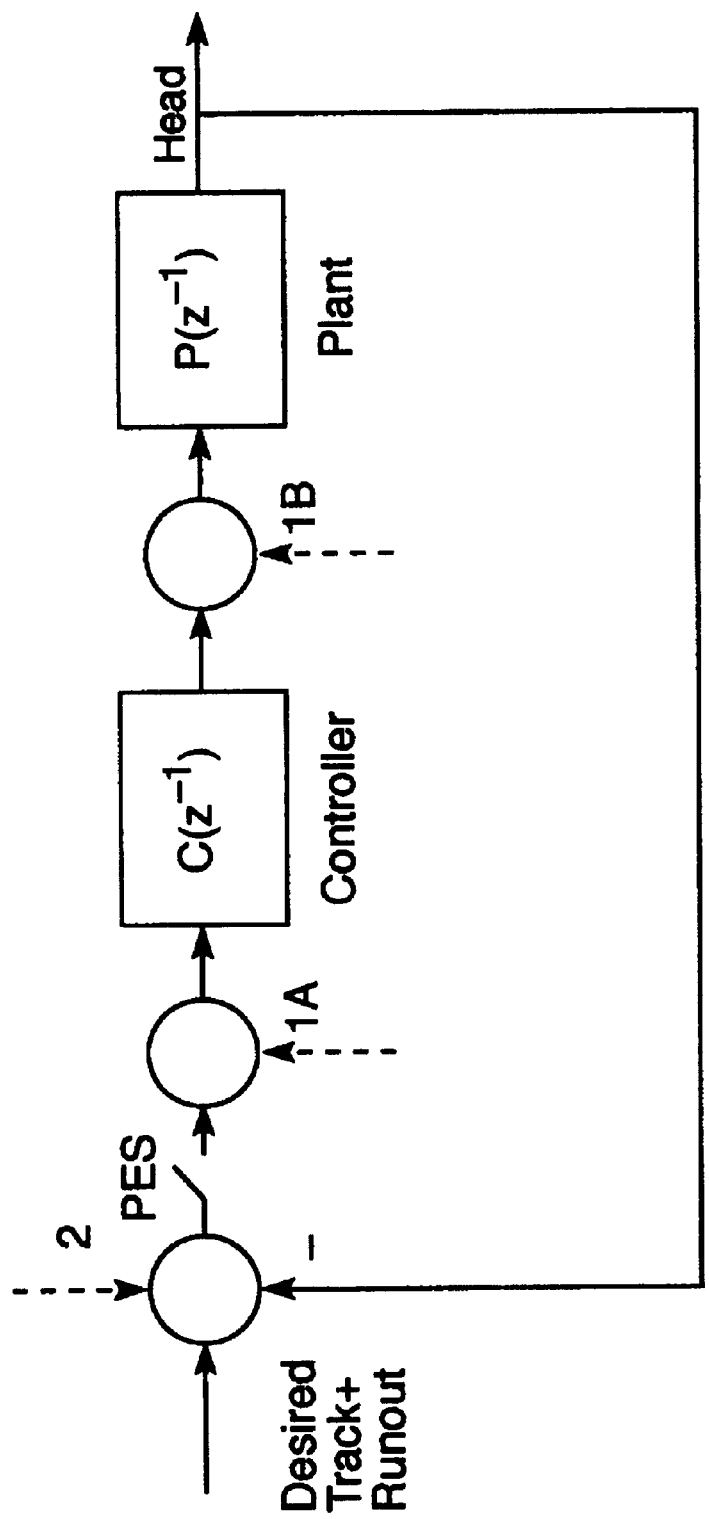
FIG. 7 illustrates how the LMS algorithm of FIG. 6 may be used to handle both runout rejection and identification by injecting the signal at different locations in the control loop.

The LMS algorithm of FIG. 6 may be used to handle both runout rejection and identification by injecting the signal at different locations in the control loop, as illustrated in FIG. 7.

For rejecting runouts, the switch at the PES signal path is closed, a signal $s_m$ is injected into the control loop at 1A or 1B, with transfer functions:

$$H_{1A}(z^{-1}) = \frac{-P(z^{-1})C(z^{-1})}{1+P(z^{-1})C(z^{-1})} \quad (6)$$

or:

$$H_{1B}(z^{-1}) = \frac{-P(z^{-1})}{1+P(z^{-1})C(z^{-1})} \quad (7)$$

The actual track runout may be calculated by discounting the appropriate transfer characteristics.

For identifying runouts directly, the switch at PES signal path is opened, a signal $s_m$ is injected into the control loop at 2, with transfer function:

$$H_2(z^{-1})=1 \quad (8)$$

An algorithm may be provided to implement 4-D shock detection. Assuming head n is reading/writing data and positioning from servo information from disk surface n. Shock-sensing information will be derived from the other heads, head m without loss of generality.

When position measurement from head n is available, a correction control signal $u_{rro,n}$ is injected through location 1A of the control loop, with the PES signal path closed, to drive the PES signal to zero.

The runout, $r_{rro,n}$ due to disk n is related to $u_{rro,n}$ by:

$$r_{rro,n}=PCu_{rro,n} \quad (9)$$

When position measurement from head m is available, a signal $r_{rro,mn}$ is injected at point 2 with the PES signal path opened, calculated according to the adaptive algorithm in the previous section, together with an interpolated signal calculated from the sinusoidal correction signal $u_{rro,n}$ at point 2. It may be seen that asymptotically:

$$r_{rro,nm}=r_{rro,n}-r_{rro,m} \quad (10)$$

In this manner, all the runouts of all the different surfaces may be adapted in the same time it takes for adapting the runout due to one head.

During seeking and settling, runout adaptation is frozen. Position measurements from different heads, discounted by the most recent runout measurements may be used to increase the sampling rate to improve servo bandwidths and reduce acoustic noise.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A hard drive incorporating a shock-sensing system comprising:

a plurality of disk surfaces, each of the plurality of disk surfaces having a plurality of concentric tracks;

a plurality of heads coupled together to move across the plurality of disk surfaces in unison, each of said heads corresponding to one of the plurality of disk surfaces;

a plurality of servo fields provided within one or more of the plurality of concentric tracks of the plurality of disk surfaces, at least a portion of the plurality of servo fields being staggered from one another such that at least one servo field for one disk surface coincides with a data field for another disk surface;

a read/write head amplifier, coupled to the plurality of heads, for selectively reading, from multiple heads of the plurality of heads, staggered servo fields on disk surfaces during a write operation; and a disk drive controller coupled to the read/write head amplifier, for alternately reading servo field information from the plurality of disk surfaces, wherein disk drive shock is detected during a read/write operation by detecting when the plurality of heads have deviated from a track by detecting deviation of one of the plurality of heads from one or more of the plurality of staggered servo sectors on the disk surfaces.

2. The hard drive of claim 1, wherein the plurality of servo fields further comprises:

a plurality of servo fields provided within one or more of the plurality of concentric tracks of the plurality of disk surfaces, the plurality of servo fields being staggered from one another such that each servo field for one disk surface coincides with a data field for another disk surface.

3. The hard drive of claim 1, wherein the plurality of heads comprises:
   a plurality of n read heads provided to read a corresponding number of the plurality of disk surfaces; and
   a plurality of n write heads provided to write a corresponding number of the plurality of disk surfaces, and
   wherein the read/write head amplifier further comprises:
      a plurality of n read switches, each coupled to a corresponding one of the plurality of n read heads; and
      a plurality of n write switches, each coupled to a corresponding one of the plurality of n write heads;
      wherein each of the plurality of n read switches are selectively engagable independently of engagement of the plurality of n write switches.

4. The hard drive of claim 3, wherein the plurality of read switches is selectively engaged to read servo data from the plurality of read heads while one of the plurality of write switches is engaged to write data on one of the plurality of write heads.

5. The hard drive of claim 3, wherein the read/write head amplifier further comprises:
   a primary read circuit, selectively coupled to one of the plurality of n read heads via the plurality of n read switches, for reading data from corresponding disk surfaces;
   a plurality of secondary n read switches, each coupled to a corresponding one of the n read heads; and
   a secondary read circuit, selectively coupled to the plurality of n read heads via corresponding secondary n read switches,
   wherein the secondary n read switches are selectively activated to read servo information from the plurality of disk surfaces while the n read switches select one of the plurality of n read heads to perform a read operation.

6. The hard drive of claim 1, further comprising:
   means for identifying runout of one or more of the plurality of disk surfaces, comprising a least-mean-squares adaptive algorithm.

7. A hard drive incorporating a shock-sensing system comprising:
   a plurality of disk surfaces, each of the plurality of disk surfaces having a plurality of concentric tracks;
   a plurality of heads coupled together to move across the plurality of disk surfaces in unison, each of said heads corresponding to one of the plurality of disk surfaces;
   a plurality of servo fields provided within one or more of the plurality of concentric tracks of the plurality of disk surfaces, at least a portion of the plurality of servo fields being staggered from one another such that at least one servo field for one disk surface coincides with a data field for another disk surface;
   a read/write head amplifier, coupled to the plurality of heads, for selectively reading, from multiple heads of the plurality of heads, staggered servo fields on disk surfaces during a write operation;
   a disk drive controller coupled to the read/write head amplifier, for alternately reading servo field information from the plurality of disk surfaces; and
   means for identifying runout of one or more of the plurality of disk surfaces, comprising a least-mean-squares adaptive algorithm,
   wherein disk drive shock is detected during a read/write operation by detecting when the plurality of heads have deviated from a track by detecting deviation of one of the plurality of heads from one or more of the plurality of staggered servo sectors on the disk surfaces, and
   wherein said least-means-squares adaptive algorithm considers a periodic signal with a periodicity of N samples, the periodicity corresponding to the total number of servo samples per track, each sample comprising a linear combination of integer (N/2) sinusoids.

8. The hard drive of claim 7 wherein the least-means-squares algorithm drives a position error signal asymptotically to zero by modifying weights $A_m$ and $B_m$ using the following algorithm:

$$S_m(k) = A_m(i)\sin\left(\frac{2\Pi mk}{N}\right) + B_m(i)\cos\left(\frac{2\Pi mk}{N}\right)$$

where:

$$\begin{bmatrix} A_m(i+1) \\ B_m(i+1) \end{bmatrix} = \begin{bmatrix} A_m(i) \\ B_m(i) \end{bmatrix} + \frac{\lambda_m}{\gamma_m}\begin{bmatrix} \cos(\phi_m) & \sin(\phi_m) \\ -\sin(\phi_m) & \cos(\phi_m) \end{bmatrix}\begin{bmatrix} \epsilon_A(i) \\ \epsilon_b(i) \end{bmatrix}$$

and:

$$\begin{bmatrix} \epsilon_A(i) \\ \epsilon_B(i) \end{bmatrix} = \begin{bmatrix} \frac{2}{N}\sum_{k=0}^{N-1} PES(k)\sin\left(\frac{2\Pi mk}{N}\right) \\ \frac{2}{N}\sum_{k=0}^{N-1} PES(k)\cos\left(\frac{2\Pi mk}{N}\right) \end{bmatrix}$$

$$\phi_m = 2\Pi\frac{m}{N}$$

$$\gamma_m = |H(e^{-jphi_m})|$$

Where $\lambda_m$ is the adaptation gain at each frequency.

9. The hard drive of claim 8, wherein runout of at least one of the plurality of disk surfaces is rejected by injecting a signal $s_m$ into the control loop with at least one of the following transfer functions:

$$H_{1A}(z^{-1}) = \frac{-P(z^{-1})C(z^{-1})}{1+P(z^{-1})C(z^{-1})}$$

and:

$$H_{1B}(z^{-1}) = \frac{-P(z^{-1})}{1+P(z^{-1})C(z^{-1})}.$$

10. The hard drive of claim 8 wherein runout of at least one of the plurality of disk surfaces is identified directly by injecting a signal $s_m$ is injected into the control loop at 2, with transfer function:

$$H_2(z^{-1})=1.$$

11. The hard drive of claim 7, wherein the plurality of servo fields further comprises:
   a plurality of servo fields provided within one or more of the plurality of concentric tracks of the plurality of disk surfaces, the plurality of servo fields being staggered from one another such that each servo field for one disk surface coincides with a data field for another disk surface.

12. The hard drive of claim 7, wherein the plurality of heads comprises:

a plurality of n read heads provided to read a corresponding number of the plurality of disk surfaces; and a plurality of n write heads provided to write a corresponding number of the plurality of disk surfaces, and wherein the read/write head amplifier further comprises:

a plurality of n read switches, each coupled to a corresponding one of the plurality of n read heads; and a plurality of n write switches, each coupled to a corresponding one of the plurality of n write heads;

wherein each of the plurality of n read switches are selectively engagable independently of engagement of the plurality of n write switches.

13. The hard drive of claim 12, wherein the plurality of read switches is selectively engaged to read servo data from the plurality of read heads while one of the plurality of write switches is engaged to write data on one of the plurality of write heads.

14. The hard drive of claim 12, wherein the read/write head amplifier further comprises:

a primary read circuit, selectively coupled to one of the plurality of n read heads via the plurality of n read switches, for reading data from corresponding disk surfaces;

a plurality of secondary n read switches, each coupled to a corresponding one of the n read heads; and a secondary read circuit, selectively coupled to the plurality of n read heads via corresponding secondary n read switches, wherein the secondary n read switches are selectively activated to read servo information from the plurality of disk surfaces while the n read switches select one of the plurality of n read heads to perform a read operation.

15. A method of detecting shock in a hard drive including a plurality of disk surfaces, each of the plurality of disk surfaces having a plurality of concentric tracks; a plurality of heads coupled together to move across the plurality of disk surfaces in unison, each of said heads corresponding to one of the plurality of disk surfaces; a plurality of servo fields provided within one or more of the plurality of concentric tracks of the plurality of disk surfaces, at least a portion of the plurality of servo fields being staggered from one another such that at least one servo field for one disk surface coincides with a data field for another disk surface; a read/write head amplifier, coupled to the plurality of heads, for selectively reading, from multiple heads of the plurality of heads, staggered servo fields on disk surfaces during a write operation; and a disk drive controller coupled to the read/write head amplifier, the method comprising the steps of:

alternately reading, with the disk drive controller, servo field information from the plurality of disk surfaces, and detecting disk drive shock during a read/write operation by detecting when the plurality of heads have deviated from a track by detecting deviation of one of the plurality of heads from one or more of the plurality of staggered servo sectors on the disk surfaces.

16. The method of claim 12, wherein the plurality of servo fields further comprises a plurality of servo fields provided within one or more of the plurality of concentric tracks of the plurality of disk surfaces, the plurality of servo fields being staggered from one another such that each servo field for one disk surface coincides with a data field for another disk surface and said step of alternately reading, with the disk drive controller, servo field information from the plurality of disk surfaces comprising the step of reading servo information from each of the plurality of disk surfaces when a servo field is adjacent a corresponding one of the plurality of heads.

17. The method of claim 15, wherein the plurality of heads comprises a plurality of n read heads provided to read a corresponding number of the plurality of disk surfaces and a plurality of n write heads provided to write a corresponding number of the plurality of disk surfaces, the read/write head amplifier further comprises a plurality of n read switches, each coupled to a corresponding one of the plurality of n read heads and a plurality of n write switches, each coupled to a corresponding one of the plurality of n write heads; said step of alternately reading, with the disk drive controller, servo field information from the plurality of disk surfaces, further comprises the step of:

selectively engaging the plurality of n read switches independently of engagement of the plurality of n write switches.

18. The method of claim 17, further comprising the step of:

selectively engaging the plurality of read switches to read servo data from the plurality of read heads while one of the plurality of write switches is engaged to write data on one of the plurality of write heads.

19. The method of claim 17, wherein the read/write head amplifier further comprises a primary read circuit, selectively coupled to one of the plurality of n read heads via the plurality of n read switches, for reading data from corresponding disk surfaces, a plurality of secondary n read switches, each coupled to a corresponding one of the n read heads, and a secondary read circuit, selectively coupled to the plurality of n read heads via corresponding secondary n read switches, wherein said step of alternately reading, with the disk drive controller, servo field information from the plurality of disk surfaces, further comprises the step of:

selectively activating the secondary n read switches to read servo information from the plurality of disk surfaces while activating one of the plurality of n read switches to select one of the plurality of n read heads to perform a read operation.

20. The method of claim 15, further comprising the step of:

identifying runout of one or more of the plurality of disk surfaces using a least-mean-squares adaptive algorithm.

21. The method of claim 20, further comprising the step of:

selectively engaging the plurality of read switches to read servo data from the plurality of read heads while one of the plurality of write switches is engaged to write data on one of the plurality of write heads.

22. A method of detecting shock in a hard drive including a plurality of disk surfaces, each of the plurality of disk surfaces having a plurality of concentric tracks; a plurality of heads coupled together to move across the plurality of disk surfaces in unison, each of said heads corresponding to one of the plurality of disk surfaces; a plurality of servo fields provided within one or more of the plurality of concentric tracks of the plurality of disk surfaces, at least a portion of the plurality of servo fields being staggered from one another such that at least one servo field for one disk surface coincides with a data field for another disk surface; a read/write head amplifier, coupled to the plurality of heads, for selectively reading, from multiple heads of the plurality of heads, staggered servo fields on disk surfaces during a write operation; and a disk drive controller coupled to the read/write head amplifier, the method comprising the steps of:

alternately reading, with the disk drive controller, servo field information from the plurality of disk surfaces, detecting disk drive shock during a read/write operation by detecting when the plurality of heads have deviated from a track by detecting deviation of one of the plurality of heads from one or more of the plurality of staggered servo sectors on the disk surfaces, and identifying runout of one or more of the plurality of disk surfaces using a least-mean-squares adaptive algorithm, wherein said least-means-squares adaptive algorithm considers a periodic signal with a periodicity of N samples, the periodicity corresponding to the total number of servo samples per track, each sample comprising a linear combination of integer (N/2) sinusoids.

23. The method of claim 22 wherein the least-means-squares algorithm drives a position error signal asymptotically to zero by modifying weights $A_m$ and $B_m$ using the following algorithm:

$$S_m(k) = A_m(i)\sin\left(\frac{2\Pi mk}{N}\right) + B_m(i)\cos\left(\frac{2\Pi mk}{N}\right)$$

where:

$$\begin{bmatrix} A_m(i+1) \\ B_m(i+1) \end{bmatrix} = \begin{bmatrix} A_m(i) \\ B_m(i) \end{bmatrix} + \frac{\lambda_m}{\gamma_m}\begin{bmatrix} \cos(\phi_m) & \sin(\phi_m) \\ -\sin(\phi_m) & \cos(\phi_m) \end{bmatrix}\begin{bmatrix} \epsilon_A(i) \\ \epsilon_b(i) \end{bmatrix}$$

and:

$$\begin{bmatrix} \epsilon_A(i) \\ \epsilon_B(i) \end{bmatrix} = \begin{bmatrix} \frac{2}{N}\sum_{k=0}^{N-1} PES(k)\sin\left(\frac{2\Pi mk}{N}\right) \\ \frac{2}{N}\sum_{k=0}^{N-1} PES(k)\cos\left(\frac{2\Pi mk}{N}\right) \end{bmatrix}$$

$$\phi_m = 2\Pi\frac{m}{N}$$

Where $\lambda_m$ is the adaptation gain at each frequency:

$$\gamma_m = |H(e^{-jphi_m})|.$$

24. The method of claim 23, wherein runout of at least one of the plurality of disk surfaces is rejected by injecting a signal $s_m$ into the control loop with at least one of the following transfer functions:

$$H_{1A}(z^{-1}) = \frac{-P(z^{-1})C(z^{-1})}{1+P(z^{-1})C(z^{-1})}$$

and:

$$H_{1B}(z^{-1}) = \frac{-P(z^{-1})}{1+P(z^{-1})C(z^{-1})}.$$

25. The method of claim 23 wherein runout of at least one of the plurality of disk surfaces is identified directly by injecting a signal $s_m$ is injected into the control loop at 2, with transfer function:

$$H_2(z^{-1})=1.$$

26. The method of claim 22, wherein the plurality of servo fields further comprises a plurality of servo fields provided within one or more of the plurality of concentric tracks of the plurality of disk surfaces, the plurality of servo fields being staggered from one another such that each servo field for one disk surface coincides with a data field for another disk surface and said step of alternately reading, with the disk drive controller, servo field information from the plurality of disk surfaces comprising the step of reading servo information from each of the plurality of disk surfaces when a servo field is adjacent a corresponding one of the plurality of heads.

27. The method of claim 22, wherein the plurality of heads comprises a plurality of n read heads provided to read a corresponding number of the plurality of disk surfaces and a plurality of n write heads provided to write a corresponding number of the plurality of disk surfaces, the read/write head amplifier further comprises a plurality of n read switches, each coupled to a corresponding one of the plurality of n read heads and a plurality of n write switches, each coupled to a corresponding one of the plurality of n write heads; said step of alternately reading, with the disk drive controller, servo field information from the plurality of disk surfaces, further comprises the step of:

selectively engaging the plurality of n read switches independently of engagement of the plurality of n write switches.

28. The method of claim 27, wherein the read/write head amplifier further comprises a primary read circuit, selectively coupled to one of the plurality of n read heads via the plurality of n read switches, for reading data from corresponding disk surfaces, a plurality of secondary n read switches, each coupled to a corresponding one of the n read heads, and a secondary read circuit, selectively coupled to the plurality of n read heads via corresponding secondary n read switches, wherein said step of alternately reading, with the disk drive controller, servo field information from the plurality of disk surfaces, further comprises the step of:

selectively activating the secondary n read switches to read servo information from the plurality of disk surfaces while activating one of the plurality of n read switches to select one of the plurality of n read heads to perform a read operation.

* * * * *